United States Patent [19]

Siegenthaler

[11] Patent Number: 5,250,252
[45] Date of Patent: Oct. 5, 1993

[54] METHOD AND DEVICE FOR STABILIZING CURED TIRES

[75] Inventor: Karl J. Siegenthaler, Rome, Italy

[73] Assignee: Bridgestone/Firestone, Inc., Akron, Ohio

[21] Appl. No.: 725,164

[22] Filed: Jul. 3, 1991

[30] Foreign Application Priority Data

Jul. 27, 1990 [IT] Italy .................. 67595 A/90

[51] Int. Cl.⁵ ............................................. B29C 71/02
[52] U.S. Cl. .................................. 264/502; 264/237; 425/58.1; 425/446; 425/36; 425/73
[58] Field of Search ........................ 425/32, 58.1, 28.1, 425/38, 40, 44, 50, 143, 445, 446, 29, 47, 36, 73; 264/501, 502, 315, 326, 237, 348

[56] References Cited

U.S. PATENT DOCUMENTS

| | | |
|---|---|---|
| 2,066,265 | 12/1936 | Freeman . |
| 3,008,180 | 11/1961 | Woodall . |
| 3,075,237 | 1/1963 | Soderquist . |
| 3,170,187 | 2/1965 | Brundage . |
| 3,483,596 | 12/1969 | Ulm . |
| 3,495,296 | 2/1970 | Ericson et al. . |
| 3,645,660 | 2/1972 | Hugger et al. . |
| 3,667,881 | 6/1972 | Cimprich . |
| 3,692,444 | 9/1972 | Hugger et al. . |
| 3,712,769 | 2/1969 | Cimprich . |
| 3,847,631 | 11/1974 | MacMillan ........................ 425/47 |
| 3,852,008 | 12/1974 | Shichman ........................ 425/58.1 |
| 4,092,090 | 5/1978 | Yuhas et al. . |
| 4,680,001 | 7/1987 | Waters ................................. 425/29 |
| 4,702,669 | 10/1987 | Ichikawa et al. . |
| 4,728,274 | 3/1988 | Siegenthaler ...................... 425/38 |
| 5,115,852 | 5/1992 | DeLorean .......................... 156/119 |

Primary Examiner—Jeffery Thurlow
Assistant Examiner—Mathieu Vargot
Attorney, Agent, or Firm—David A. Thomas

[57] ABSTRACT

A method and device (1) for stabilizing a tire extracted at a relatively high temperature from a tire curing mold, whereby the tire (2) to be stabilized is inflated to a given pressure by a pressurized fluid, and cooled from the inside by circulating the pressurized fluid along a closed circuit (44) defined, at least partially, by the tire (2) and by a radiator (45) located outside thereof.

11 Claims, 3 Drawing Sheets

METHOD AND DEVICE FOR STABILIZING CURED TIRES

TECHNICAL FIELD

The present invention relates to a method of stabilizing cured tires.

BACKGROUND OF THE ART

In particular, the present invention relates to a method of stabilizing tires extracted, at a relatively high temperature, generally of about 180° C., from a curing mold. When manufacturing tires, particularly vehicle tires having internal body plies formed from nylon cords or other synthetic fibers which shrink when cooled, it is now customary to subject each tire, upon extraction from the curing mold, to a stabilizing operation generally consisting in mounting the tire on a support, inflating it to a given pressure, usually of about 3 atmospheres, and maintaining this pressure long enough for the tire to cool below a given temperature, usually of about 100° C.

Such a process, usually referred to as "post inflation", provides, not only for preventing the synthetic cords from shrinking, thus avoiding undesired distortion of the tire, but also for stabilizing the shape of the cords, which is extremely useful in terms of finished tire quality. Stabilizing cured tires, however, usually involves a number of drawbacks for the manufacturer, mainly due to the relatively long time required for cooling, and the size of currently used stabilizing equipment. Generally speaking, in fact, the time required at present for ensuring correct stabilization of a tire is roughly twice that required for curing. Consequently, two stabilizing machines are usually required for each curing mold, each of which usually features complex centralized systems for supplying cooling fluids such as water and/or air, for cooling the outer surface of the tires during stabilization.

SUMMARY OF THE INVENTION

The aim of the present invention is to provide a tire stabilizing method designed to overcome the above drawbacks, and which enables relatively fast cooling of tires extracted from a curing mold, with no need for centralized systems. With this aim in view, according to the present invention, there is provided a method of stabilizing cured tires extracted at relatively high temperature from a curing mold; said method comprising a stage consisting in inflating said tire to a given pressure by means of a pressurized fluid, and being characterized by the fact that it also comprises a stage consisting in cooling said tire from the inside by circulating said pressurized fluid along a closed circuit defined at least partially by said tire and by radiating means outside same.

The above method preferably comprises a further stage consisting in generating, via fan means, a forced stream of outside air through said radiator means and, if necessary, over the outer surface of said tire.

According to a preferred embodiment of the above method, prior to being inflated by said pressurized fluid, the tire is engaged with supporting means cooperating with the tire and defining with the same a fluid-tight chamber; said chamber forming part of said closed circuit for circulating said pressurized fluid, and said pressurized fluid being force circulated along said circuit.

The present invention also relates to a device for stabilizing cured tires extracted at relatively high temperature from a curing mold; said device comprising means for supplying pressurized fluid inside said tire and inflating the same to a given pressure, and being characterized by the fact that said supply means comprise a closed circuit for circulating said pressurized fluid; said circuit being defined at least partially by said tire and comprising radiator means outside same.

The above device preferably also comprises fan means for generating a forced stream of outside air through said radiator means, and, if necessary, conveying means for conveying part of said forced stream of outside air over the outer surface of said tire. According to a preferred embodiment, the above device comprises supporting means designed to cooperate with said tire and define, with same, a fluid-tight chamber; said chamber forming part of said closed circuit for circulating said pressurized fluid; and force circulating means being housed inside said circuit.

BRIEF DESCRIPTION OF THE DRAWINGS

A non-limiting embodiment of the present invention will be described by way of example with reference to the accompanying drawings, in which.

BEST MODE FOR CARRYING OUT THE INVENTION

Figure 1:
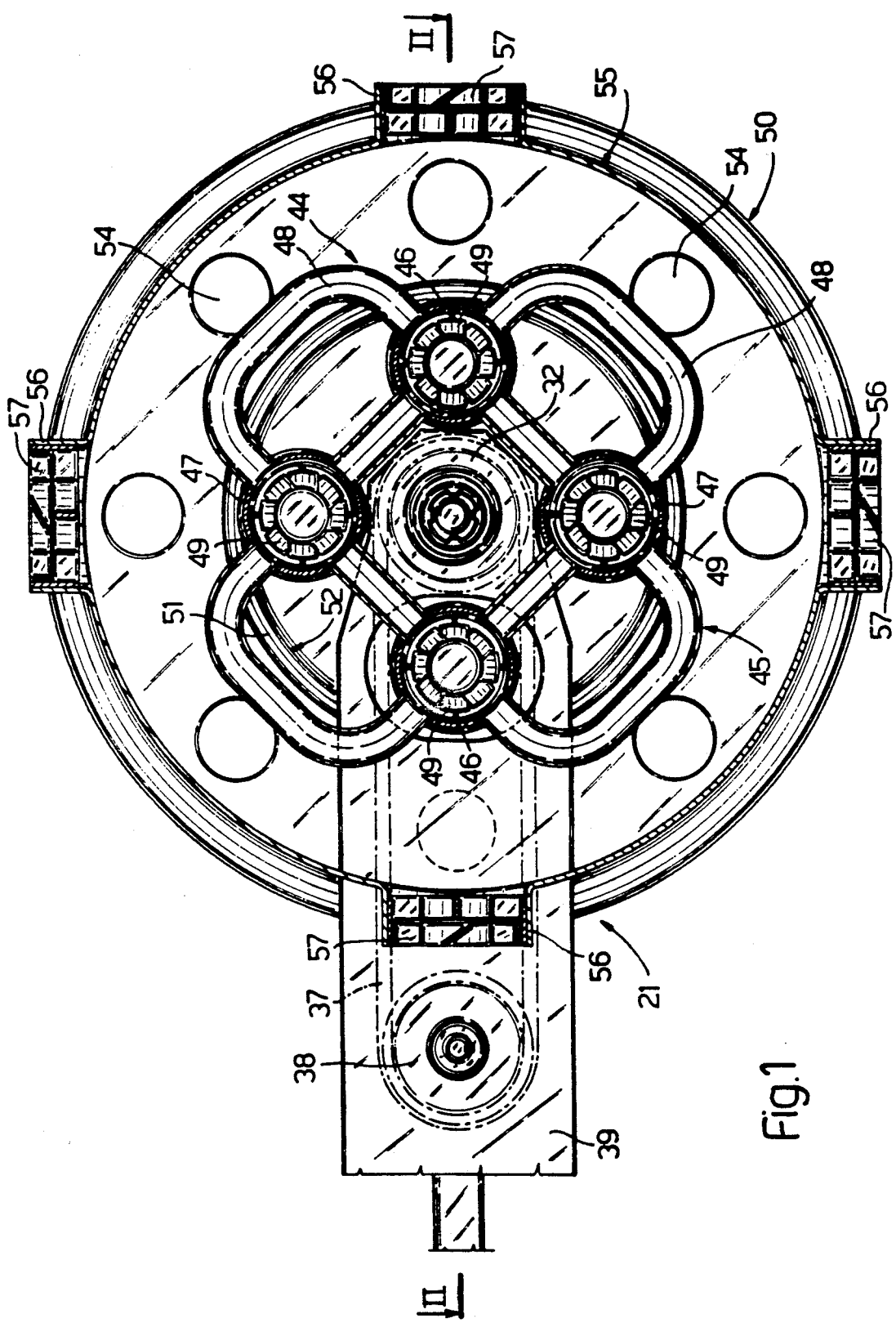
FIG. 1 shows a schematic, partially-sectioned plan view, with parts removed for simplicity, of a preferred embodiment of a cured tire stabilizing device in accordance with the present invention.
Figure 2:
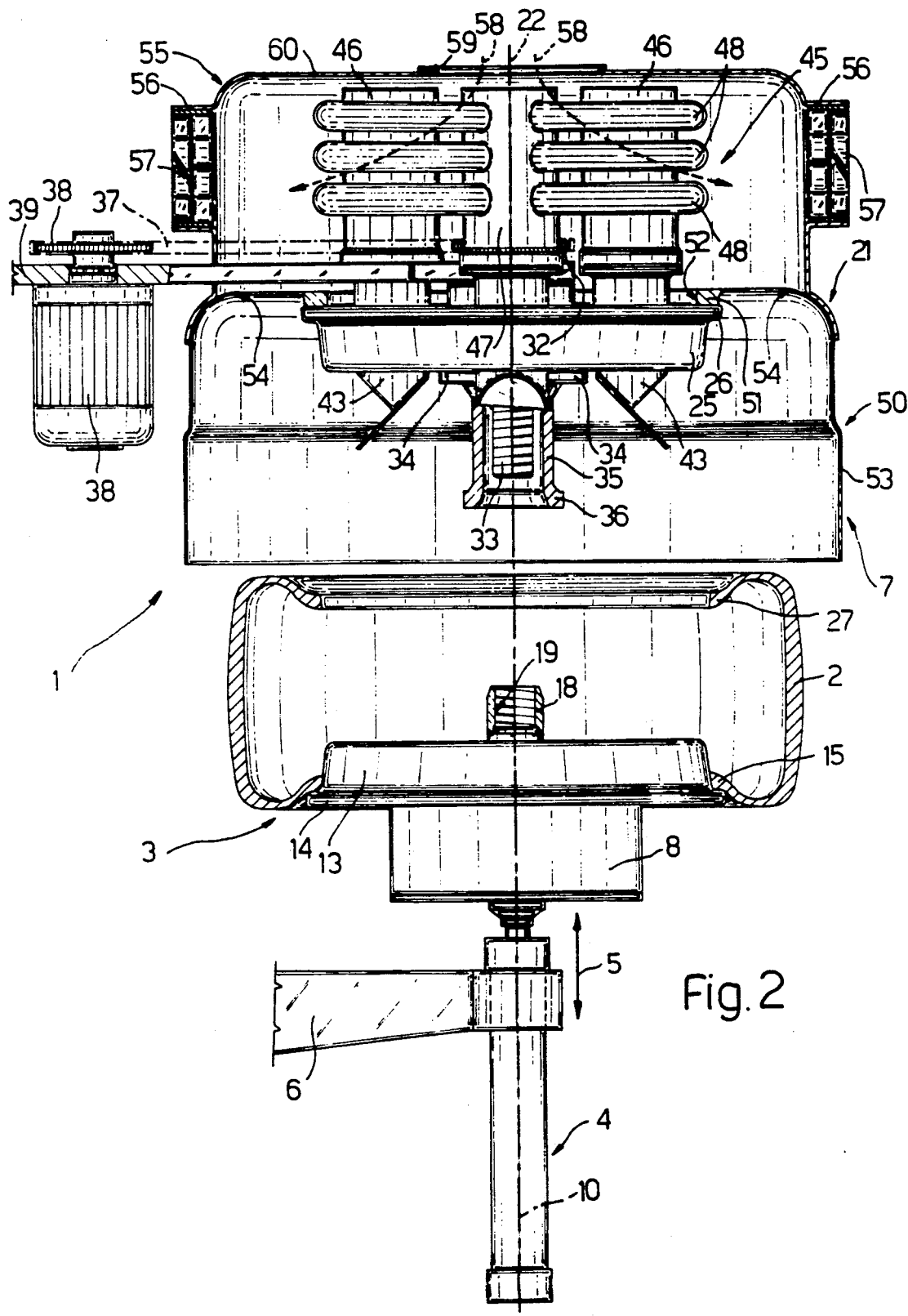
FIG. 2 and 3 show sections along line II—II in FIG. 1 of the FIG. 1 device in two distinct operating positions.
Figure 3:
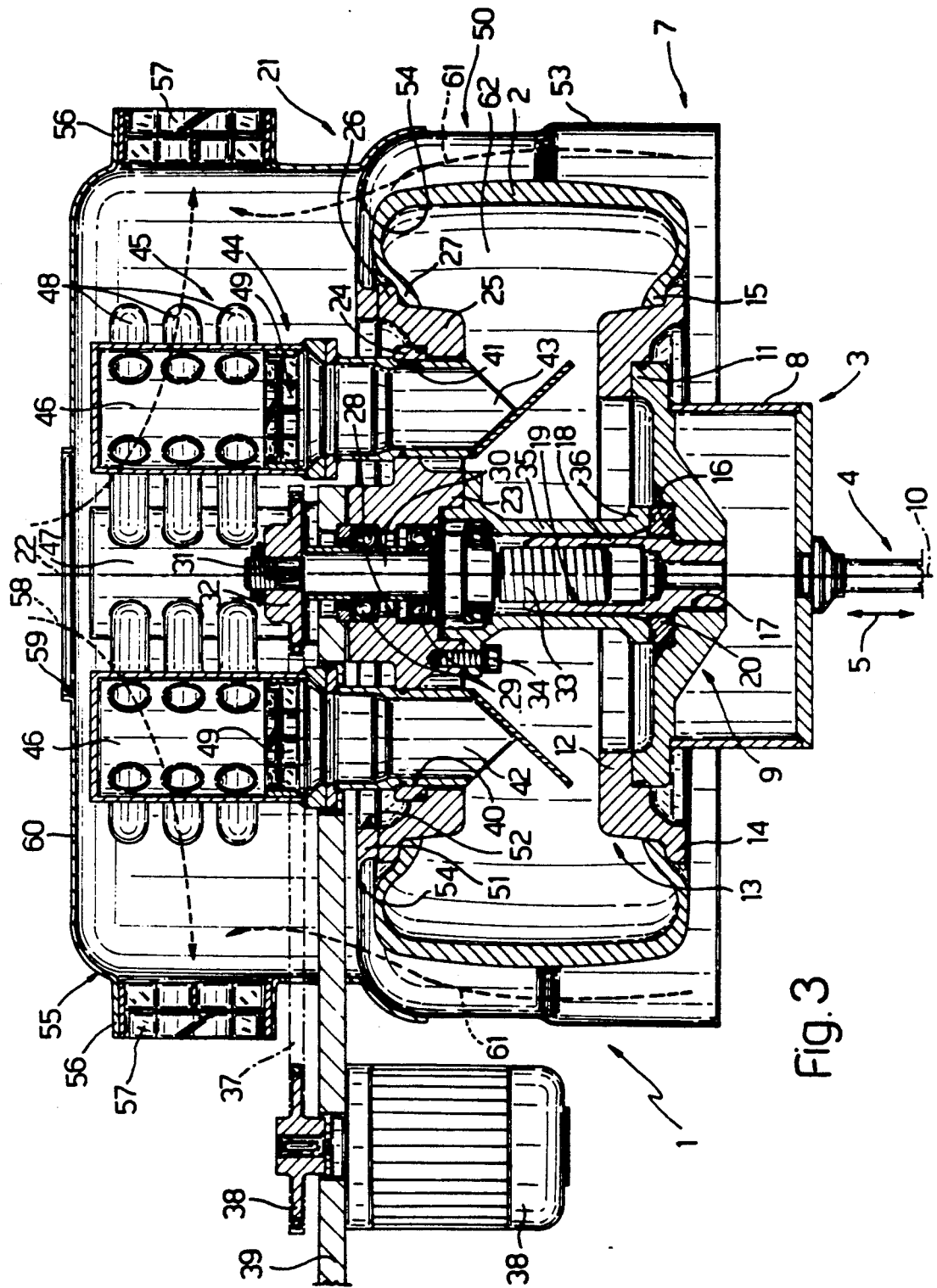

Number 1 in the accompanying drawings indicates a device for stabilizing tires 2 extracted from a curing mold (not shown) at a relatively high temperature, generally of about 180° C. As shown more clearly in FIGS. 2 and 3, device 1 comprises a lower supporting unit 3 connected to the top end of an actuator 4 for moving unit 3 vertically, as shown by arrow 5, between a lowered idle position (FIG. 2) and a raised operating position (FIG. 3). Actuator 4 may be fixed or, as in the example shown, connected to an arm 6 designed to move, by virtue of activating means (not shown), between a loading station (not shown) at said curing mold (not shown), and a stabilizing station 7.

With reference to FIG. 3, unit 3 also comprises a tubular body 8 constituting the output element of actuator 4 and fitted, on the top end, integral with a substantially round plate 9 having a substantially vertical axis 10. The outer edge of plate 9 presents an upper annular rib 11 for supporting and connecting, by means of screws (not shown), a flange 12 extending inwardly from the narrower end of an annular, substantially truncated-cone body 13 coaxial with axis 10 tapering upwardly. The lateral surface of annular body 13 presents an outer flange 14 defining a supporting surface for a respective bead portion 15 of tire 2.

Plate 9 presents an upper central cavity 16 coaxial with axis 10 and having a central threaded through hole 17 engaged by a threaded portion of a tubular appendix 18 extending upwardly from plate 9 having a threaded axial hole 19 coaxial with axis 10. Cavity 16 houses a tubular spacer 20 fitted on to appendix 18 and selectable from a series of spacers (not shown) of the same type but differing in thickness. Device 1 also comprises a second supporting unit indicated as a whole by 21 and mounted in fixed manner at stabilizing station 7, in such a position that, when unit 3 is in stabilizing station 7, unit 21 is located over unit 3 with axis 22 coaxial with axis 10.

Unit 21 comprises a central hub 23 coaxial with axis 22 and having an outer flange 24. The outer edge of flange 24 is connected, in removable manner (not shown), to an inner peripheral portion of an annular, substantially truncated-cone body 25 coaxial with axis 22 and directly facing annular body 13 when unit 3 is in stabilizing station 7. As in the case of annular body 13, the lateral surface of annular body 25 presents a flange 26 defining a supporting surface for a respective bead portion 27 of tire 2.

Through hub 23, there is formed an axial hole 28 housing, via the interposition of a number of bearings 29, a rotary shaft 30, one portion 31 of which projects from the top of hub 23 and is fitted with a toothed pulley 32, and another externally threaded portion 33 of which projects from the bottom of hub 23 and is designed to engage threaded hole 19 in appendix 18 when unit 3 is in stabilizing station 7.

The surface of hub 23, facing unit 3, is fitted, by means of screws 34, with the outer flange of a tubular appendix 35 coaxial with axis 22, longer than appendix 18, and having an inside diameter at least equal to the outside diameter of same. The bottom end of tubular appendix 35 presents a flange 36 by which appendix 35 rests in fluid-tight manner on the upper surface of spacer 20 when portion 33 of shaft 30 engages appendix 18 subsequent to upward displacement of unit 3 by actuator 4, and the rotation of pulley 32 by a toothed belt 37 powered by a reversible motor 38 supported on a plate 39 integral with hub 23 and extending laterally from the top end of hub 23.

Flange 24 presents a first and second pair of diametrically-opposed axial holes, 40 and 41, located in perpendicular planes through axis 22. Holes 40 and 41 are respectively engaged in fluid-tight manner by the inlet and outlet conduits 42 and 43 of a circuit 44 for circulating pressurized fluid, preferably nitrogen, supplied to circuit 44 through a known inlet and drain valve (not shown). One portion of circuit 44 consists of a radiator 45 constituting the upper portion of element 21 and comprising a pair of vertical pipes 46 connected to the top end of conduits 42, and a further pair of vertical pipes 47 connected to the top end of conduits 43. Radiator 45 also comprises a number of transverse loop conduits 48 connecting pipes 45 and 46. For force circulating said pressurized fluid along circuit 44, each of vertical pipes 46 and 47 houses an appropriately oriented powered fan 49.

Unit 21 comprises a conveyor bell 50 with a base wall 51 and perpendicular to axis 22 and having a central hole 52 substantially equal in diameter to the inside diameter of the wider upper end of annular body 25. Wall 51 is secured, via means not shown, to the upper end surface of annular body 25, and is fitted on its outer edge with a substantially cylindrical lateral wall 53 facing downwardly.

Through wall 51 and coaxially with central hole 52, there is formed a ring or plurality of openings 54 enabling communication between bell 50 and a substantially cylindrical conveyor 55 surrounding radiator 45 and having its bottom end connected to wall 51 outwardly of opening 54. Through conveyor 55, there are mounted a number of radial conduits 56 communicating externally and each housing a powered extractor 57 for drawing in air both from above (arrows 58 in FIG. 3) through a central hole 59 formed through upper wall 60, and from below (arrows 61 in FIG. 3) through openings 54.

In actual use, a tire 2 extracted from a curing mold (not shown) is placed between units 3 and 21 in stabilizing station 7. In the specific embodiment shown, tire 2 is placed on annular body 13 of unit 3, with lower bead portion 15 substantially resting on flange 14. Via displacement of arm 6, unit 3, which is maintained by actuator 4 in the lowered idle position, is then moved into stabilizing station 7, coaxial with axis 22 and at such a height as to enable tire 2 to pass beneath flange 35 of appendix 34 on unit 21.

Actuator 4 is then operated so as to raise unit 3 into the operating position and gradually bring tubular appendix 18 into engagement with appendix 35 and subsequently into contact with the bottom end of lower portion 33 of shaft 30. Operation of motor 38 gradually engages portion 33 of shaft 30 and appendix 18, so as to bring flange 36 of appendix 35 into fluid-tight contact with the upper surface of spacer 20, which is so selected that, subsequent to fluid-tight contact of flange 36 and spacer 20, bead portion 27 of tire 2 substantially contacts flange 26 which is located a given distance from flange 14 contacting bead portion 15. This defines, between units 3 and 21, an annular chamber 62 extending inwardly of tire 2 and connecting inlet and outlet conduits 42 and 43 of circuit 44, which may now be fed with said pressurized fluid for inflating tire 2, engaging bead portions 15 and 27 of tire 2 in fluid-tight manner with respective flanges 14 and 26, and outwardly sealing chamber 62 in fluid-tight manner.

At this point, fans 49 may be operated for force circulating said fluid along circuit 44 and through radiator 45, which is swept from above by a stream of cooling air drawn in by extractors or fans 57 in the direction of arrows 58 in FIG. 3. Said air stream provides for rapidly cooling the pressurized fluid circulating at high speed inside circuit 44, and therefore for rapidly cooling tire 2 as a whole until the required stabilizing temperature is reached. Known compensating members (not shown) obviously provide for maintaining the fluid inside circuit 44 at a given constant pressure during cooling. In other words, therefore, the same fluid is employed for both inflating tire 2 and cooling it from the inside.

According to the embodiment shown, the internal action of said pressurized fluid is preferably, though not necessarily, accompanied by the external action of a further stream of cooling air, which sweeps over the outer surface of tire 2 and is drawn in from below into bell 50 by extractors 57 through openings 54 (which may be dispensed with) in the direction of arrows 61 in FIG. 3.

An important point to note in connection with stabilizing device 1 as described above is that, in addition to cooling tire 2 internally by force circulating said pressurized fluid, thus drastically reducing the cooling time currently required on known stabilizing devices, device 1 is extremely compact and lightweight, and may be installed off the floor, thus eliminating the frequently high cost of providing for a machine bed.

Moreover, the structure of device 1 as described above provides for a high degree of flexibility, and for making relatively rapid changes, within a given range, to the format of tires having the same inside diameter, said change in format being achieved by simply changing spacer 20, which provides for fluid-tight engagement of units 3 and 21 and a given clearance between annular bodies 13 and 25.

From the foregoing description and the operational discussion, when read in light of the several drawings, it is believed that those familiar with the art will readily recognize and appreciate the novel concepts and features of the present invention. Obviously, while the invention has been described in relation to only a limited number of embodiments, numerous variations, changes, substitutions and equivalents will present themselves to persons skilled in the art and may be made without necessarily departing from the scope and principles of this invention. As a result, the embodiments described herein are subject to various modifications, changes and the like without departing from the spirit and scope of the invention with the latter being determined solely by reference to the claims appended hereto.

I claim:

1. A method of stabilizing a cured tire extracted at relatively high temperature from a curing mold; said method comprising the steps of inflating said tire to a given pressure by means of a pressurized fluid; cooling said tire from the inside by circulating said pressurized fluid along a closed circuit defined at least partially by said tire and by radiator means; and cooling said pressurized fluid by passing a second fluid directly over said radiator means by generating, via fan means, a forced stream of outside air through said radiator means.

2. A method as claimed in claim 1, comprising the further step of generating, via said fan means, a forced stream of outside air over the outer surface of said tire.

3. A method as claimed in claim 2, comprising the further step of prior to being inflated by said pressurized fluid, engaging said tire with supporting means cooperating with said tire and defining, with same, a fluid-tight chamber; said chamber forming part of said closed circuit for circulating said pressurized fluid; and said pressurized fluid being force circulated along said circuit.

4. A method as claimed in claim 3, wherein said supporting means include two opposed supporting units, one of which supports said radiator means; said tire being placed between said two supporting units, which are then connected so as to cooperate in a fluid-tight manner with respective bead portions of said tire, and define, together with said tire, said chamber.

5. A device for stabilizing cured tires extracted at a relatively high temperature from a tire curing mold; said device comprising:
 a) means for applying a pressurized fluid inside a tire whereby said pressurized fluid inflates said tire;
 b) closed circuit means for circulating said pressurized fluid through said tire to cool said tire;
 c) radiator means included within said closed circuit, and located external of said tire, for passing said pressurized fluid therethrough;
 d) fan means for generating a forced stream of outside air through said radiator means; and
 e) means for allowing outside air to flow over said radiator means to extract heat from said pressurized fluid flowing through said radiator means.

6. A method as claimed in claim 5, further comprising conveying means for conveying part of said forced stream of outside air over the outer surface of said tire.

7. A method as claimed in claim 6 further comprising supporting means designed to cooperate with said tire and defined, with same, a fluid-tight chamber; said chamber forming part of said closed circuit for circulating said pressurized fluid; and means for force circulating said pressurized fluid contained within said circuit.

8. A method as claimed in claim 7, further comprising said supporting means which include two opposed, facing supporting units, each designed to cooperate in a fluid-tight manner with a respective bead portion of said tire; and means for releasably connecting said two units and engaging same with said respective bead portions for defining said chamber.

9. A method as claimed in claim 8, wherein said connecting means include a screw-nut screw coupling.

10. A device as claimed 9, wherein said screw-nut screw coupling is power driven.

11. A method as claimed in claim 10, further comprising spacer means of adjustable length between said two supporting units.

* * * * *